(12) United States Patent
Muta et al.

(10) Patent No.: US 7,925,417 B2
(45) Date of Patent: Apr. 12, 2011

(54) CONTROL APPARATUS AND METHOD FOR INTERNAL COMBUSTION ENGINE

(75) Inventors: Koichiro Muta, Okazaki (JP);
Katsuhiko Yamaguchi, Nisshin (JP);
Eiji Masuda, Toyota (JP)

(73) Assignees: Toyota Jidosha Kabushiki Kaisha, Aichi-ken (JP); Denso Corporation, Aichi-pref (JP)

( * ) Notice: Subject to any disclaimer, the term of this patent is extended or adjusted under 35 U.S.C. 154(b) by 274 days.

(21) Appl. No.: 12/279,272

(22) PCT Filed: Feb. 23, 2007

(86) PCT No.: PCT/IB2007/000440
§ 371 (c)(1),
(2), (4) Date: Aug. 13, 2008

(87) PCT Pub. No.: WO2007/096756
PCT Pub. Date: Aug. 30, 2007

(65) Prior Publication Data
US 2009/0118980 A1 May 7, 2009

(30) Foreign Application Priority Data

Feb. 24, 2006 (JP) .................................. 2006-048908

(51) Int. Cl.
*B60T 7/12* (2006.01)
(52) U.S. Cl. ........................................ 701/103; 701/113
(58) Field of Classification Search .................. 701/103, 701/104, 105, 113
See application file for complete search history.

(56) References Cited

U.S. PATENT DOCUMENTS

| 7,238,133 | B2* | 7/2007 | Tabata et al. ...................... 475/5 |
| 7,552,003 | B2* | 6/2009 | Suzuki et al. .................... 701/51 |
| 2002/0179047 | A1 | 12/2002 | Hoang et al. |
| 2004/0035622 | A1* | 2/2004 | Ito et al. ........................ 180/197 |
| 2005/0005914 | A1* | 1/2005 | Tamechika et al. ........... 123/478 |
| 2005/0261817 | A1 | 11/2005 | Koenig et al. |

FOREIGN PATENT DOCUMENTS

| DE | 100 31 438 A1 | 4/2001 |
| JP | 08-193531 A | 7/1996 |
| JP | 2000-104599 A | 4/2000 |
| JP | 2000-120455 A | 4/2000 |
| JP | 2001-207884 A | 8/2001 |
| JP | 2002-115579 A | 4/2002 |
| JP | 2002-213279 A | 7/2002 |
| JP | 2002-339781 A | 11/2002 |
| JP | 2003-003884 A | 1/2003 |
| JP | 2004-346781 A | 12/2004 |
| JP | 2005-307815 A | 11/2005 |

* cited by examiner

*Primary Examiner* — John T Kwon
(74) *Attorney, Agent, or Firm* — Sughrue Mion, PLLC

(57) ABSTRACT

An engine ECU (280) and an HV_ECU (320) control a throttle motor (296) such that the throttle valve opening degree (TH) does not exceed a prescribed limit (THlim) and a rate of increase (Ta/t) in the throttle valve opening degree is equal to or lower than a predetermined opening degree increase rate (Tb/t) for a predetermined time period after start-up of the engine (120) is initiated. Thus, power output from the engine is controlled so as not to increase significantly for the predetermined time period. Accordingly, while the engine starts up, a shock that can be felt by a driver can be suppressed. In addition, variation in the amount of air taken into the engine when the engine is started is also reduced, which reduces variation in the amount of pollutants in the exhaust gas emitted while the engine starts up.

5 Claims, 8 Drawing Sheets

CONTROL APPARATUS AND METHOD FOR INTERNAL COMBUSTION ENGINE

BACKGROUND OF THE INVENTION

1. Field of the Invention

The invention relates generally to a control apparatus and method for an internal combustion engine, and, more specifically to a control apparatus and method that enables an internal combustion engine installed in a vehicle to start in an appropriate manner.

2. Description of the Related Art

There is an engine control apparatus that is employed in an economy running vehicle equipped with an economy running system or in a hybrid vehicle where the driving source can be switched between the engine and a motor, and that stops the engine when a predetermined engine-stop condition is satisfied and restarts the engine when a predetermined engine-restart condition is satisfied.

For example, Japanese Patent Application Publication No. 2002-339781 (JP-A-2002-339781) describes a control apparatus for a vehicle engine that enables the engine to restart when an engine-restart instruction is issued while the engine is off. The control apparatus includes restart control means for controlling the amount of air taken into the engine while the engine is being restarted in a manner in which the lower the pressure is in an intake pipe of the engine, the greater amount of air is taken into the engine. If an engine-restart instruction is issued when the in-cylinder pressure remains while the engine is off, the control apparatus increases the amount of air is taken into the engine to execute the instruction.

According to the method for restarting the engine described in JP-A-2002-339781, the amount of air taken into the engine while the engine is being restarted may be different each time. This may cause the following inconveniences.

For example, in a hybrid vehicle, when the vehicle is running with low engine efficiency, a motor, instead of the engine, is used as the driving source. On the other hand, when the vehicle is running with high engine efficiency, the engine, instead of the motor, is used as the driving source. When the driving source switches from the motor to the engine, the engine is restarted.

If the amount of air taken into the engine while the engine is being restarted is different each time, the torque output from the engine immediately after the engine starts self-operating may also be different each time. Accordingly, for example, when the torque output from the engine abruptly increases, a driver may sense undesirable vibrations.

Further, if the amount of the air taken into the engine while the engine starts up varies, the air-fuel ratio of the air-fuel mixture to be burned may also vary. This may vary the amount of pollutants in the exhaust gas emitted while the engine starts up. However, JP-A-2002-339781 does not address such inconveniences.

SUMMARY OF THE INVENTION

The invention provides a control apparatus and method for an internal combustion engine, which enables an internal combustion engine installed in a vehicle to start in an appropriate manner.

An aspect of the invention relates to a control apparatus and method for an internal combustion engine installed in a vehicle. The internal combustion engine is provided with a throttle valve that adjusts the amount of air taken into the internal combustion engine. The control apparatus includes a throttle valve drive unit and a start-up control unit. The throttle valve drive unit drives the throttle valve to change the opening degree of the throttle valve. The start-up control unit controls the throttle valve drive unit such that the opening degree does not exceed a prescribed limit and the rate of increase in the opening degree is equal to or lower than a predetermined opening degree increase rate for a predetermined time period after start-up of the internal combustion engine is initiated.

The start-up control unit may include an opening degree command unit and an output power control unit. The opening degree command unit calculates a target opening degree based on a required power to be output from the internal combustion engine and commands the throttle valve drive unit to open the throttle valve by the target opening degree. The output power control unit executes a limiting control that changes the required power such that the rate of increase in the required power is equal to or lower than a predetermined power increase rate.

The output power control unit may include a vehicle power calculation unit and a limiting control unit. The vehicle power calculation unit calculates, based on at least the accelerator pedal operation amount, the vehicle power required to drive the vehicle. The limiting control unit starts the limiting control when the vehicle power exceeds a predetermined value, terminates the limiting control when the predetermined time period has elapsed after start-up of the internal combustion engine is initiated, and causes the required power to follow the vehicle power after the limiting control is completed.

The internal combustion engine may be a driving source that produces power to drive the wheels of the vehicle. The vehicle includes a motor that can be used as the driving source and a power transfer mechanism that transfers the driving force from at least one of the internal combustion engine and the motor to the wheel.

The invention enables the internal combustion engine installed in a vehicle to start in an appropriate manner.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENT

Figure 1:
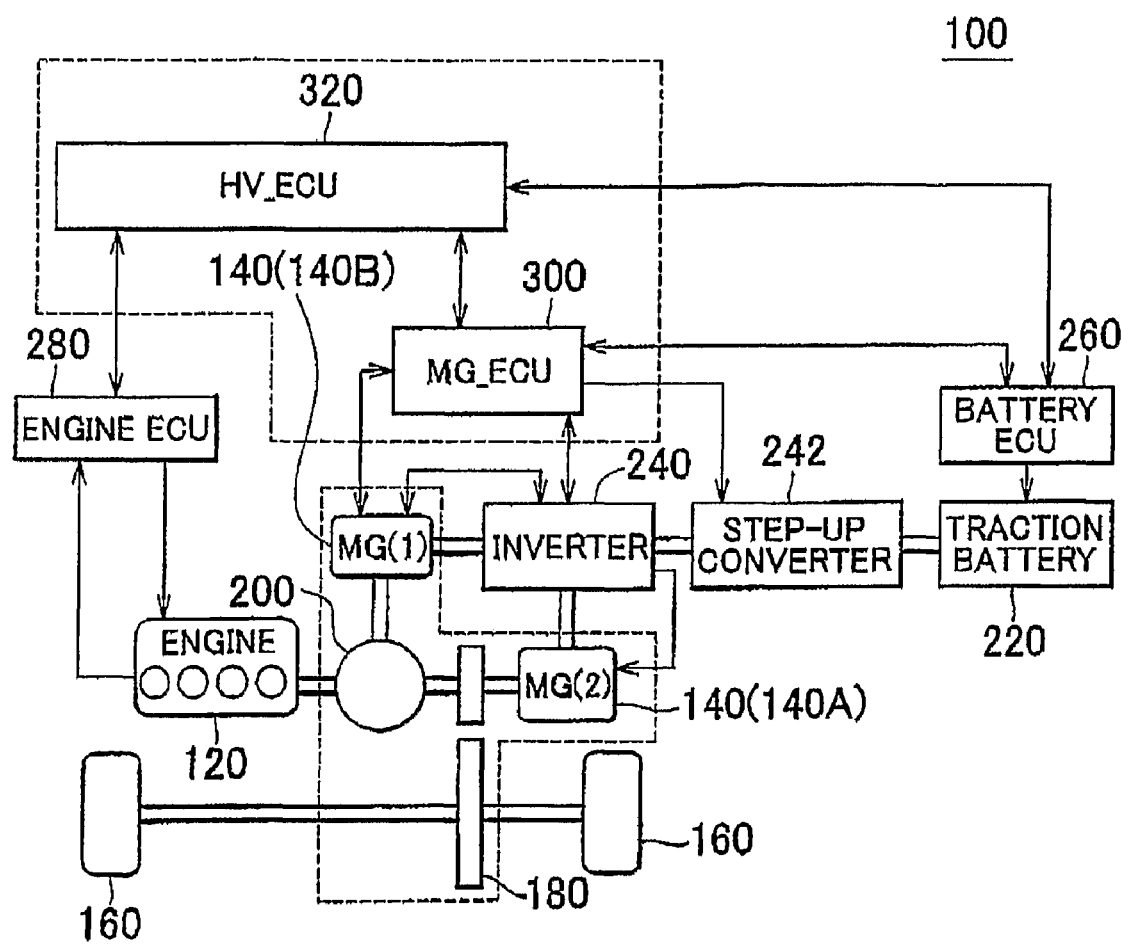
FIG. 1 is the block diagram of a hybrid vehicle equipped with a control apparatus for an internal combustion engine according to an embodiment of the invention.

Hereinafter, an embodiment of the invention will be described in detail with reference to the accompanying drawings. Note that, in the drawings, like reference numerals denote identical or equivalent elements.

FIG. 1 is the block diagram of a hybrid vehicle equipped with a control apparatus for an internal combustion engine according to the embodiment of the invention.

As shown in FIG. 1, a hybrid vehicle 100 includes, as driving sources, an internal combustion engine (hereinafter, simply referred to as an "engine") 120 such as a gasoline engine, and a motor generator (MG) 140. For the convenience of explanation, in the description below, the motor generator 140 is referred to as a motor 140A and a generator 140B (or a motor generator 140B). The motor 140A may function as a generator and the generator 140B may function as a motor depending on the running mode of the hybrid vehicle 100. The motor generator functions as a generator when a regenerative braking operation is performed. That is, if the vehicle decelerates, kinetic energy of the vehicle is converted to electric energy.

Further, the hybrid vehicle 100 includes a speed reduction gear 180 and a power split mechanism (for example, a planetary gear set) 200. The speed reduction gear 180 transfers power generated by the engine 120 and the motor generator 140 to drive wheels 160, or transfers the driving force of the drive wheels 160 to the engine 120 and the motor generator 140. The power split mechanism 200 distributes the power generated by the engine 120 between two drive-lines, one of which leads to the drive wheels 160 and the other of which leads to the generator 140B.

In this manner, the speed reduction gear 180 and the power split mechanism 200 transfer driving power from at least one of the engine and the motor to the wheels. That is, the speed reduction gear 180 and the power split mechanism 200 constitute a "power transfer mechanism" in the vehicle equipped with control apparatus for an internal combustion engine according to the embodiment of the invention.

Furthermore, the hybrid vehicle 100 includes a traction battery 220 and an inverter 240. Electric Power to drive the motor generator 140 is charged in the traction battery 220. The inverter 240 executes an electric current control while converting the direct current of the traction battery 220 into alternating current or converting the alternating currents of the motor 140A and the generator 140B into direct currents.

Still further, the hybrid vehicle 100 includes a battery control unit (hereinafter referred to as a battery ECU Electronic Control unit)) 260, an engine ECU 280, an MG_ECU 300, and an HV_ECU 320.

The battery ECU 260 controls charging-discharging states of the traction battery 220. The engine ECU 280 controls the operating state of the engine 120. The MG_ECU 300 controls the motor generator 140, the battery ECU 260, and the inverter 240 based on the condition of the hybrid vehicle 100. The HV_ECU 320 communicates with the battery ECU 260, the engine ECU 280, and the MG_ECU 300 to provide these ECUs 260, 280, and 300 with control signals. The RV ECU 320 controls the entirety of a hybrid system so that the hybrid vehicle 100 runs most efficiently.

In the embodiment of the invention, a step-up converter 242 is provided between the traction battery 220 and the inverter 240. This is because the rated voltage of the traction battery 220 is lower than the rated voltages of each of the motor 140A and the motor generator 140B. When electric power is supplied from the traction battery 220 to the motor 149A or the motor generator 140B, the step-up converter 242 boosts the voltage of the electric power.

The ECUs are separately provided in FIG. 1. However, two or more ECUs may be combined into a single ECU. For example, as illustrated by the broken line frame shown in FIG. 1, the MG_ECU 300 and the HV_ECU 320 may be combined into a single ECU. Alternatively, the engine ECU 280, the MG_ECU 300, and the HV_ECU 320 may be combined into a single ECU.

A planetary gear set may be used as the power split mechanism 200, which distributes the power from the engine 120 to the drive wheels 160 and the motor generator 140B. Controlling the rotational speed of the motor generator 140B enables the power split mechanism 200 to serve also as a continuously variable transmission, i.e. CVT. The torque from the engine 120 is input into a planetary carrier (C), and then transferred to the motor generator 140B by a sun gear (S) and transferred to the motor and an output shaft (on the side of the drive wheels 160) by a ring gear (R). In order to stop the engine 120, the kinetic energy of the rotation of the engine 120 is converted into electric energy by the motor generator 140B, which reduces the rotational speed of the engine 120.

While the engine 120 starts up in the hybrid vehicle 100, the generator 140B rotates the crankshaft of the engine 120 (i.e. cranking).

The vehicle is powered only by the motor 140A of the motor generator 140, because the efficiency of the engine 120 is low while the hybrid vehicle 100 takes off or moves at a low speed. When the hybrid vehicle 100 is in the normal running state, the power output from the engine 120 is split into two drive-paths by, for example, the power split mechanism 200. The power supplied to one of the drive-paths directly drives the drive wheels 160, and the power supplied to the other drive-paths drives the generator 140B to generate electric power. The electric power generated is used to drive the motor 140A to assist driving of the drive wheels 160.

When the hybrid vehicle 100 moves at a high speed, the electric power from the traction battery 220 is supplied additionally to the motor 140A to increase the power output from the motor 140A, thereby supplying additional driving force to the drive wheels 160.

On the other hand, when the vehicle is decelerating, the motor 140A that is driven by the drive wheels 160, serves as a generator to obtain regenerative electric power. Then, the regenerative electric power is stored in the traction battery 220. When the amount of electric power stored the traction battery 220 decreases and the traction battery 220 needs to be supplied with electric power, the power output from the engine 120 is increased to increase the amount of electric power generated by the generator 140B. Thus, the amount of electric power supplied to the traction battery 220 is increased.

Figure 2:
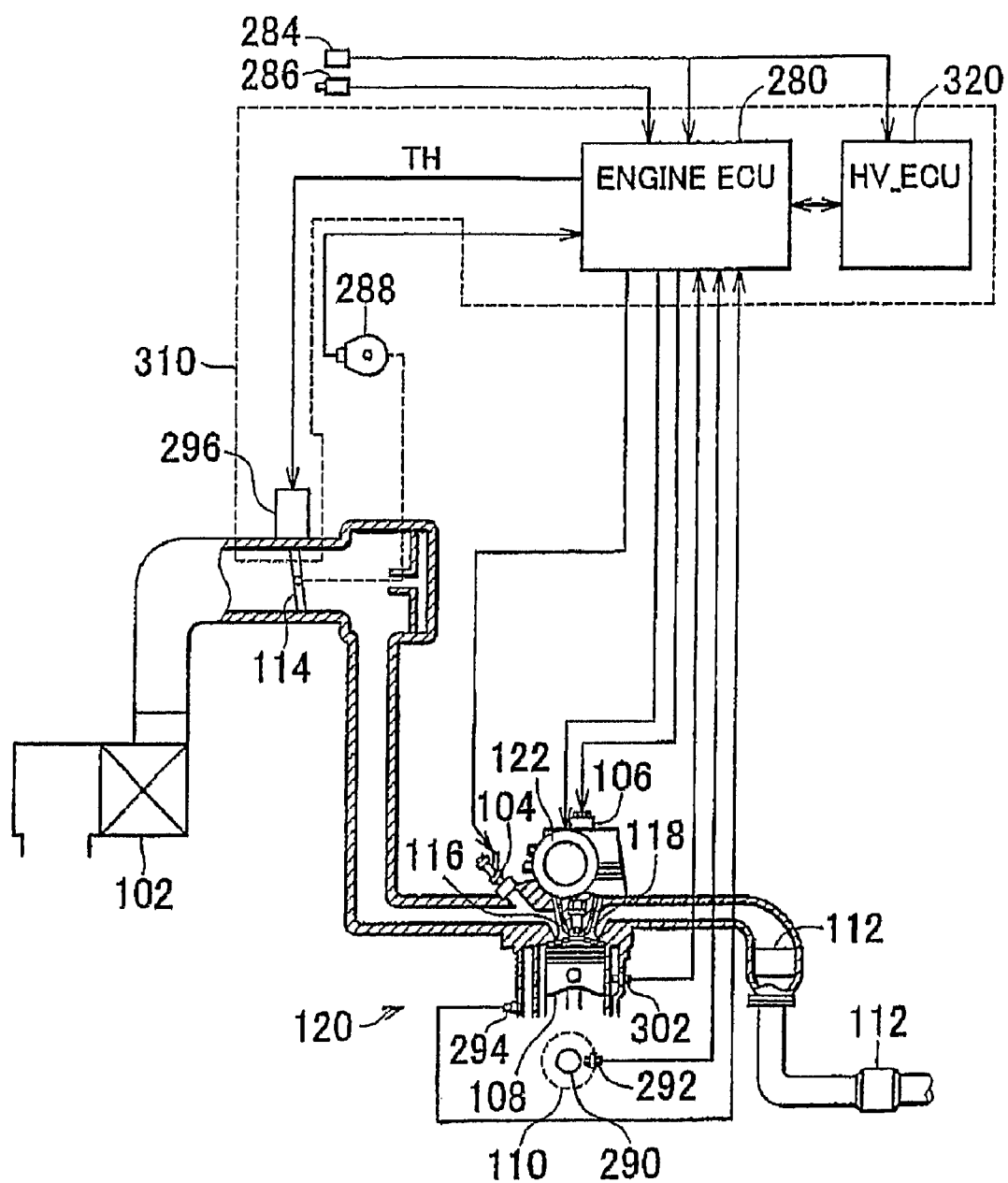
FIG. 2 is the schematic diagram showing an engine 120 that is controlled by the control apparatus according to the embodiment of the invention.

FIG. 2 is the schematic diagram showing the engine that is controlled by the control apparatus for an internal combustion engine according to the embodiment of the invention.

As shown in FIG. 2, the engine 120 is an internal combustion engine in which an air-fuel mixture, formed of the air introduced into a cylinder via an air cleaner 102 and the fuel injected from an injector 104, is ignited by an ignition plug 106 and then burned in a combustion chamber.

When the air-fuel mixture is burned, the combustion pressure pushes a piston 108 down, thereby rotating a crankshaft 110. The burned air-fuel mixture (i.e., exhaust gas) is purified by a three-way catalyst 112, and then discharged to the outside of the vehicle. A throttle valve 114 adjusts the amount of air taken into the engine 120.

When the crankshaft 110 rotates, a camshaft (not shown) for an intake valve 116 and a camshaft for an exhaust valve 118, which are connected to the crankshaft 110 by a chain, a belt or the like, are rotated. The intake valve 116 and the exhaust valve 118, provided at the top of the cylinder of the engine 120, are opened/closed by the rotation of the camshaft for the intake valve 116 and the camshaft for the exhaust valve 118, respectively. When the exhaust valve 118 is opened, exhaust gas generated by the combustion in the cylinder is discharged to the outside of the cylinder. Then, when the intake valve 116 is opened, the air-fuel mixture is introduced into the cylinder.

The camshaft for the intake valve 116 of the engine 120 is further provided with a valve timing variable mechanism 122. The camshaft for the exhaust valve 118 may also be provided with a valve timing variable mechanism. The valve timing variable mechanism 122 varies the opening/closing timings of the intake valve 116.

The engine ECU 280 is connected to a knock sensor 294, a coolant temperature sensor 302, a crank position sensor 292 that faces a timing rotor 290, a throttle valve opening degree sensor 288, a vehicle speed sensor 284, an ignition switch 286, and a throttle motor 296. The HV_ECU 320 is connected to the vehicle speed sensor 284.

The knock sensor 294 is composed of piezoelectric elements. The knock sensor 294 generates a voltage in response to vibration of the engine 120. The magnitude of the voltage is proportional to the magnitude of the vibration. The knock sensor 294 transmits a signal indicating the voltage to the engine ECU 280.

The coolant temperature sensor 302 detects the temperature of the coolant in the water jacket of the engine 120, and transmits a signal indicating the detected result to the engine ECU 280.

The timing rotor 290 is provided on the crankshaft 110, and rotates together with the crankshaft 110. A plurality of protrusions is formed on the outer face of the timing rotor 290 at predetermined intervals. The crank position sensor 292 faces the protrusions of the timing rotor 290. When the timing rotor 290 rotates, air gaps between timing rotor 290 and the crank position sensor 292 changes because the air gap between crank position sensor 292 and the portion of the timing rotor 290 with protrusion is shorter than the air gap between the crank position sensor 292 and the portion of the timing rotor without protrusion. Such a change in the air gap causes the magnetic flux passing through the coil portion of the crank position sensor 292 to alternately increase and decrease, whereby electromotive force is generated in the coil portion.

The crank position sensor 292 transmits a signal indicating the electromotive force to the engine ECU 280. The engine ECU 280 determines a crank angle based on the signal received from the crank position sensor 292.

The throttle valve opening degree sensor 288 detects the throttle valve opening degree, and transmits a signal indicating the detected result to the engine ECU 280. The vehicle speed sensor 284 detects the rotational speed of each wheel (not shown), and transmits the detected result to the engine ECU 280. The engine ECU 280 calculates the vehicle speed based on the rotational speed of each wheel. The driver turns on the ignition switch 286 to initiate the engine 120.

Base on the signals received from the respective sensors and the ignition switches 286, the engine ECU 280 executes processes, using maps and programs stored in memory (not shown) in the engine ECU 280. The engine ECU 280 then controls instruments so that the engine 120 is operated in a desired manner.

According to the embodiment of the invention, a control apparatus 310 controls the internal combustion engine. The control apparatus 310 includes the engine ECU 280, the HV_ECU 320, and the throttle motor 296. The throttle motor 296 drives the throttle valve 114 to change the opening degree of the throttle valve 114. The engine ECU 280 and the HV_ECU 320 transmit signals indicating a throttle valve opening degree TH to the throttle motor 296, thereby controlling the throttle valve opening degree. The engine ECU 280 and the HV_ECU 320 function as a "start-up control unit" in the control apparatus for an internal combustion engine according to the invention.

The engine ECU 280 and the HV_ECU 320 control the throttle motor 296 such that the throttle valve opening degree does not exceed the prescribed limit and the rate of increase in the throttle valve opening degree is equal to or lower than a predetermined opening degree increase rate for a predetermined time period after start-up of the engine 120 is initiated. Thus, the power output from the engine is limited so as not to significantly increase for the predetermined time period.

In the hybrid vehicle 100 shown in FIG. 1, the engine starts up when the running mode of the vehicle switches from a low-speed running mode to a normal running mode, for example. At this time, the amount by which the accelerator pedal is depressed by the driver has been increased to a certain degree. However, in the embodiment of the invention, the throttle valve opening degree TH when the engine 120 starts up is controlled independently of the depression amount of the accelerator pedal.

In this manner, the power output from the engine in the engine start-up is limited. Accordingly, it is possible to smoothly change the driving force when the running mode of the hybrid vehicle 100 switches from a running mode where the vehicle is powered by the motor (hereinafter sometimes referred to as "EV running mode") to a ruing mode where the vehicle is powered by the engine (hereinafter sometimes referred to as "engine running mode"). Therefore, according to the embodiment of the invention, it is possible to suppress vibration that can be felt by the driver in the engine start-up, for example. Further, according to the embodiment of the invention, it is possible to prevent variation in the amount of pollutants in the exhaust gas, because it is possible to prevent variation in the amount of air taken into the engine in the engine start-up.

In the embodiment of the invention, the "predetermined time period" includes the period in which the cranking operation is performed and the period in which the engine 120 is self-operated after the cranking operation.

Figure 3:
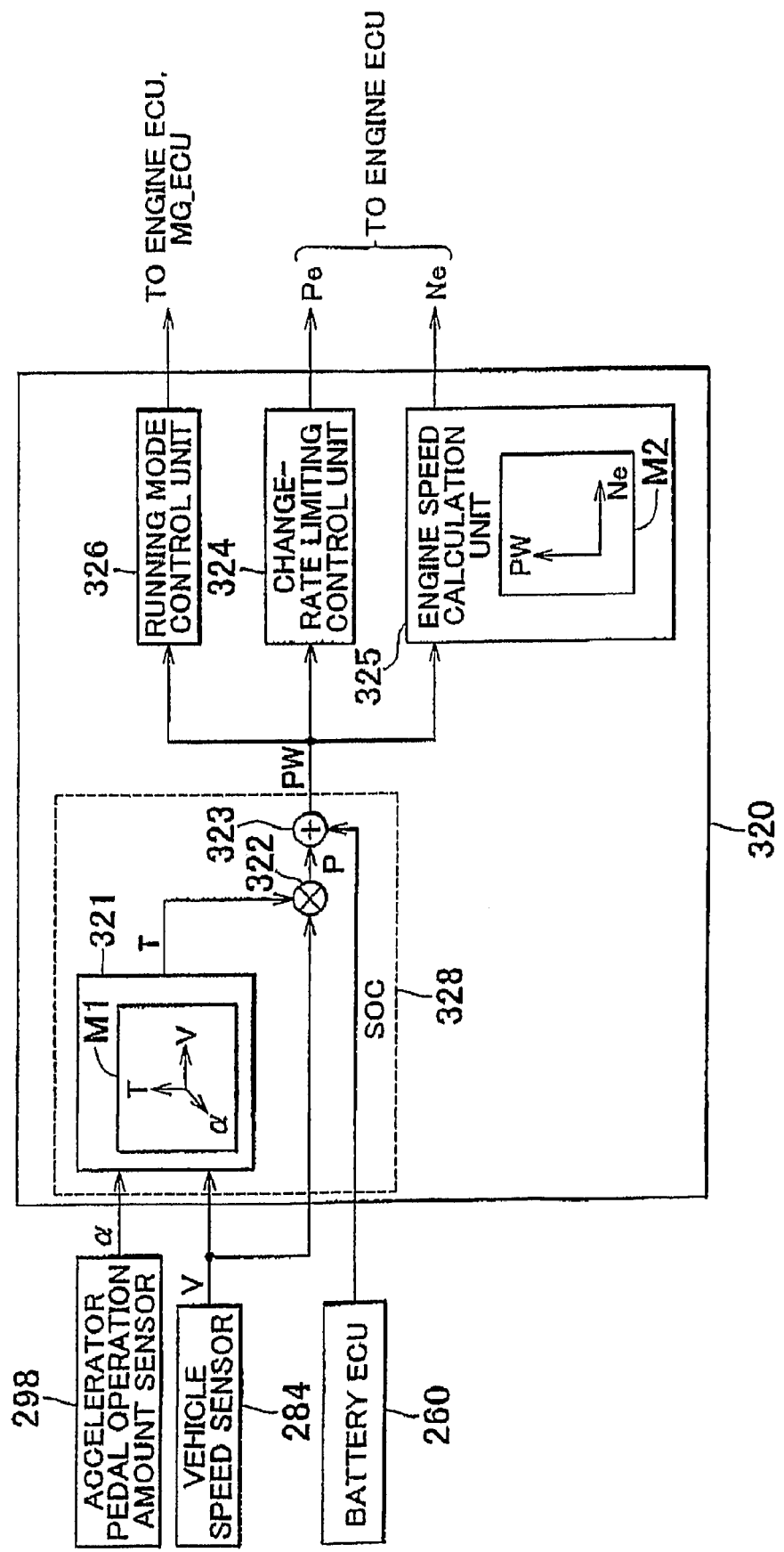
FIG. 3 is the block diagram showing the structure of a main portion of an HV_ECU 320 shown in FIG. 1 and FIG. 2.

FIG. 3 is the block diagram showing the structure of a main portion of the HV_ECU 320 shown in FIG. 1 and FIG. 2.

As shown in FIG. 3, the HV_ECU 320 includes a required torque determination unit 321, a multiplication unit 322, an addition unit 323, a change-rate limiting control unit 324, an engine speed calculation unit 325, and a running mode control unit 326.

The required torque determination unit 321 receives information on an accelerator pedal operation amount a from an accelerator pedal operation amount sensor 298. The accelerator pedal operation amount sensor 298 detects the operation of the accelerator pedal (not shown) depressed by the driver. The accelerator pedal operation amount sensor 298 is provided for the accelerator pedal in order to detect the amount by which the driver has depressed the accelerator pedal. The accelerator pedal operation amount sensor 298 outputs a voltage corresponding to the depression amount of the accelerator pedal. The signal indicating output voltage is transmitted to the required torque determination unit 321 as information on the accelerator pedal operation amount α.

Further, the required torque determination unit 321 receives information on a vehicle speed V of the hybrid vehicle 100 shown in FIG. 1 from the vehicle speed sensor 284. The required torque determination unit 321 stores, in advance, a map M1 indicating the relationship among the accelerator pedal operation amount α, the vehicle speed V, and a required torque T. The required torque determination unit 321 determines the required torque T based on the map M1.

The multiplication unit 322 calculates a running power P by multiplying the required torque T by the vehicle speed V (P=T×V). The addition unit 323 receives a value indicating the running power P from the multiplication unit 322. Further, the addition unit 323 receives a value SOC indicating the state of charge (SOC) of the traction battery 220 from the battery ECU 260. The addition unit 323 calculates a vehicle power PW by adding these values together.

The required torque determination unit 321, the multiplication unit 322, and the addition unit 323 constitute a vehicle power calculation unit 328. According to the above description, the vehicle power calculation unit 328 calculates the vehicle power PW required to drive the hybrid vehicle 100 shown in FIG. 1, based on at least the accelerator pedal operation amount α.

The change-rate limiting control unit 324 changes the required power (engine power Pe) to be output from the engine 120 shown in FIG. 2, in accordance with the vehicle power PW. The change-rate limiting control unit 324 executes a limiting control to limit the increase in engine power Pe for the predetermined time period after start-up of the engine 120 is initiated.

The "limiting control" will be described in further detail. The change-rate limiting control unit 324 changes the engine power Pe such that the rate of increase in the engine power Pe is equal to or lower than a predetermined power increase rate. The change-rate limiting control unit 324 terminates the limiting control when the predetermined time period has elapsed after the engine 120 starts up. After termination of the limiting control, the change-rate limiting control unit 324 causes the engine power Pe to follow the vehicle power PW.

As the engine power Pe is increased to the vehicle power PW, the motor power is decreased at an appropriate rate in accordance with the increase in engine power Pe. Accordingly, the allocation ratio, based on which the engine and the motor output torque, is smoothly changed without causing a sudden change in the driving force produced in the entire vehicle. Thus, it is possible to smoothly switch from the EV running mode to the engine running mode.

The engine speed calculation unit 325 stores, in advance, a map M2 indicating the relationship between the vehicle power PW and an engine speed Ne. The engine speed calculation unit 325 calculates the engine speed Ne based on the map M2. The signals indicating the engine speed Ne and the engine power Pe are transmitted to the engine ECU 280.

The running mode control unit 326 switches the running mode of the hybrid vehicle 100 between the engine running mode and the EV running mode based on the vehicle power PW. This enables to make the engine ECU 280 or the MG_ECU 300 controlled.

In this manner, the HV_ECU 320 changes the engine power Pe such that the rate of increase in the engine power Pe is equal to or lower than the predetermined power increase rate for the predetermined time period. The HV_ECU 320 functions as an "output power control unit" in the control apparatus for an internal combustion engine according to the invention.

Figure 4:
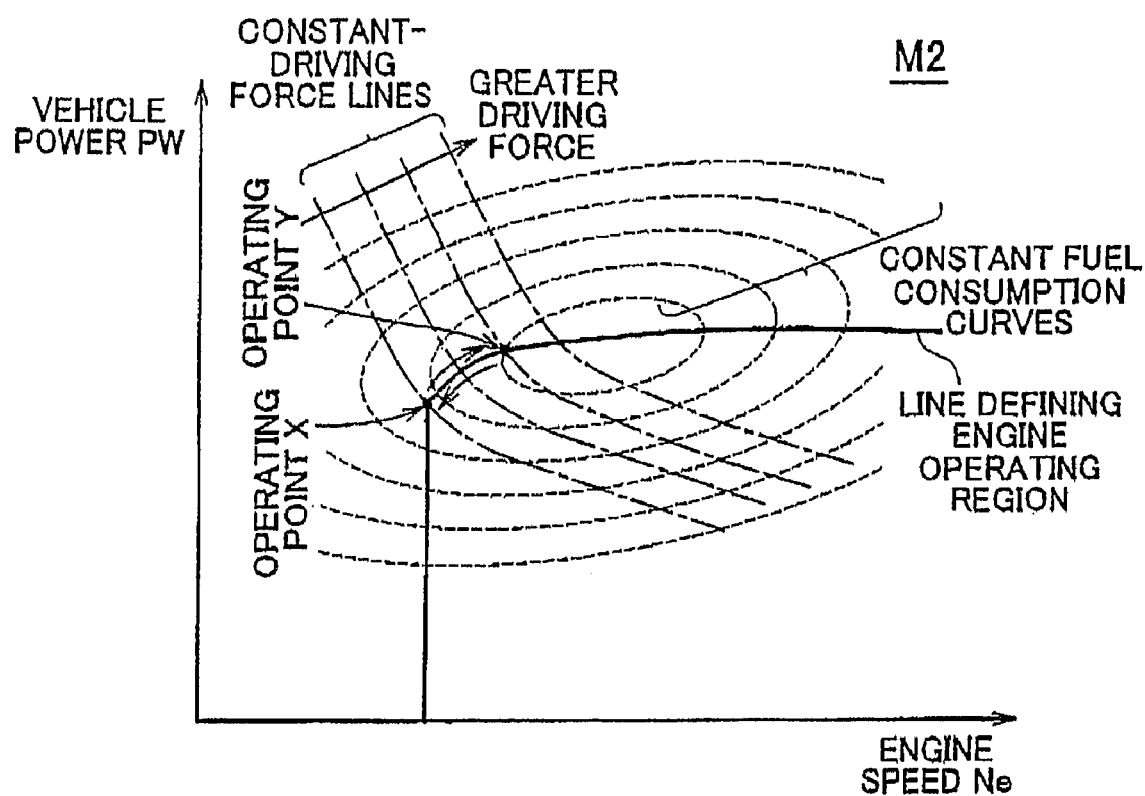
FIG. 4 is the graph showing an example of a map M2 shown in FIG. 3.

FIG. 4 is the graph showing an example of the map M2 shown in FIG. 3. In the map M2 in FIG. 4, the horizontal axis shows the engine speed Ne and the vertical axis shows the vehicle power PW. The map M2 includes constant fuel consumption curves and constant-driving force lines. When the driving force of the engine 120 is denoted by the operating point X, if the driver depresses the accelerator pedal to increase the driving force, the operating point of the engine 120 moves from the operating point X to the operating point Y on the line that defines the engine operating region. Thus, the vehicle power PW (i.e., torque from the engine 120) increases in accordance with the increase in the engine speed Ne. In this state, if the driver releases the accelerator pedal, the operating point of the engine 120 returns to the operating point X from the operating point Y.

Figure 5:
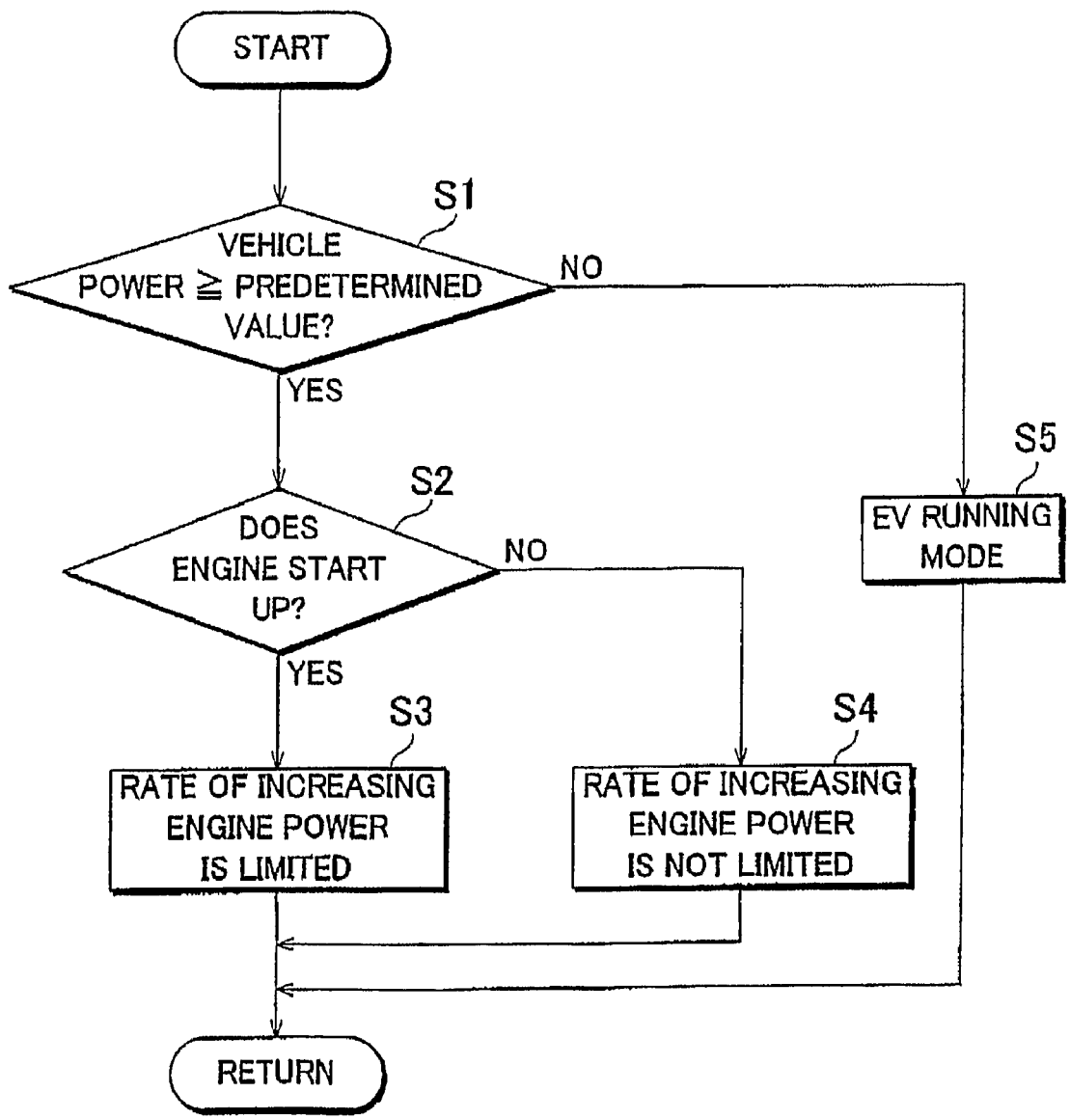
FIG. 5 is the flowchart illustrating the routine executed by the HV_ECU 320 shown in FIG. 3.

FIG. 5 is the flowchart illustrating the routine executed by the HV_ECU 320 shown in FIG. 3. With reference to FIG. 5 and FIG. 3, the routine will be described in detail. In the routine, first, it is determined in step S1 whether the vehicle power PW is equal to or greater than a predetermined value. If it is determined in step S1 that the vehicle power PW is equal to or greater than the predetermined value (YES in step S1), the process goes to step S2. On the other hand, if it is determined in step S1 that the vehicle power PW is less than the predetermined value (NO in step S1), the process goes to step S5.

In step S5, the running mode control unit 326 sets the running mode of the hybrid vehicle 100 to the EV running mode.

In step S2, the change-rate limiting control unit 324 determines whether the engine starts up. If it is determined that the engine start-up is initiated (YES in step S2), the process goes to step S3. On the other hand, if it is determined that the engine start-up has been completed (NO in step S2), the process goes to step S4.

For example, the change-rate limiting control unit 324 measures the time that has elapsed after the engine start-up is initiated. When the elapsed time is equal to or shorter than the predetermined time period, the change-rate limiting control unit 324 determines that the engine is in the middle of start-up. On the other hand, when the elapsed time exceeds the predetermined time period, the change-rate limiting control unit 324 determines that the engine start-up has been completed.

In step S3, the change-rate limiting control unit 324 limits the rate of increase in the engine power Pe. In contrast in step S4, the change-rate limiting control unit 324 does not limit the rate of increase in the engine power Pe, and causes the engine power Pe to follow the vehicle power PW.

When any one of steps S3 to S5 is completed, the process goes to step S1.

Figure 6:
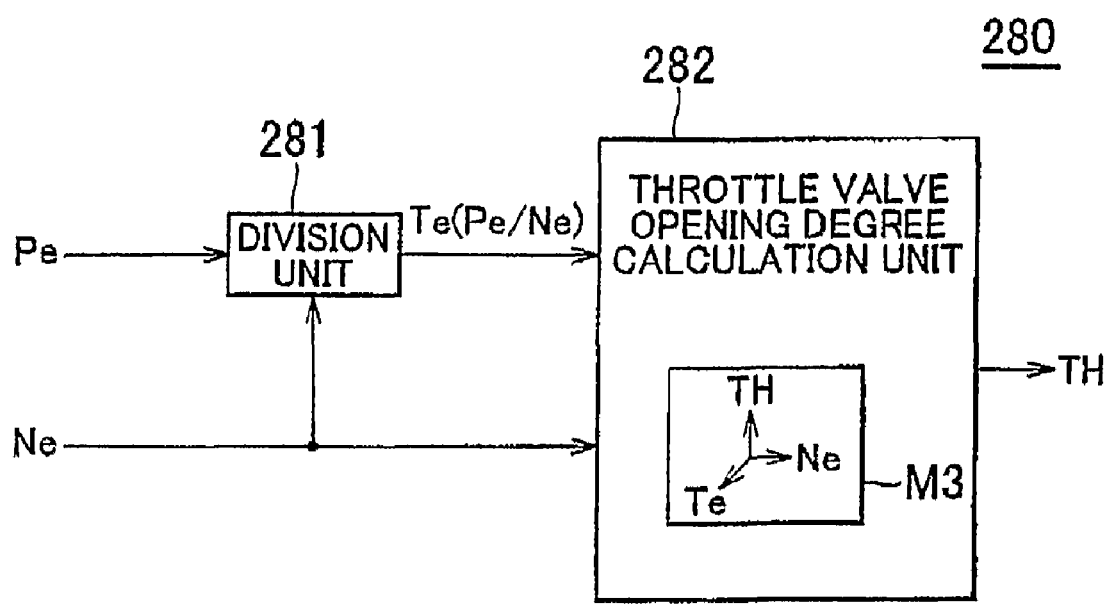
FIG. 6 is the block diagram showing the structure of a main portion of an engine ECU 280 shown in FIG. 1 and FIG. 2.

FIG. 6 is the block diagram showing the structure of a main portion of the engine ECU 280 shown in FIG. 1 and FIG. 2.

As shown in FIG. 6, the engine ECU 280 includes a division unit 281 and a throttle valve opening degree calculation unit 282. The division unit 281 receives values indicating the engine power Pe and the engine speed Ne from the HV_ECU 320. The division unit 281 divides the engine power Pe by the engine speed Ne to obtain an engine torque Te (Te=Pe/Ne).

The throttle valve opening degree calculation unit 282 receives values indicating the engine torque Te and the engine speed Ne. The throttle valve opening degree calculation unit 282 stores, in advance, a map M3 indicating the relationship among the throttle valve opening degree TH, the engine torque Te, and the engine speed Ne. The throttle valve opening degree calculation unit 282 calculates the throttle valve opening degree TH based on the map M3.

In this manner, the engine ECU 280 calculates the throttle valve opening degree TH based on the engine power Pe. Then, the engine ECU 280 commands the throttle motor 296 to open the throttle valve 114 up to the throttle valve opening degree TH. The engine ECU 280 functions as an "opening degree command unit" in the control apparatus for an internal combustion engine according to the invention.

Figure 7:
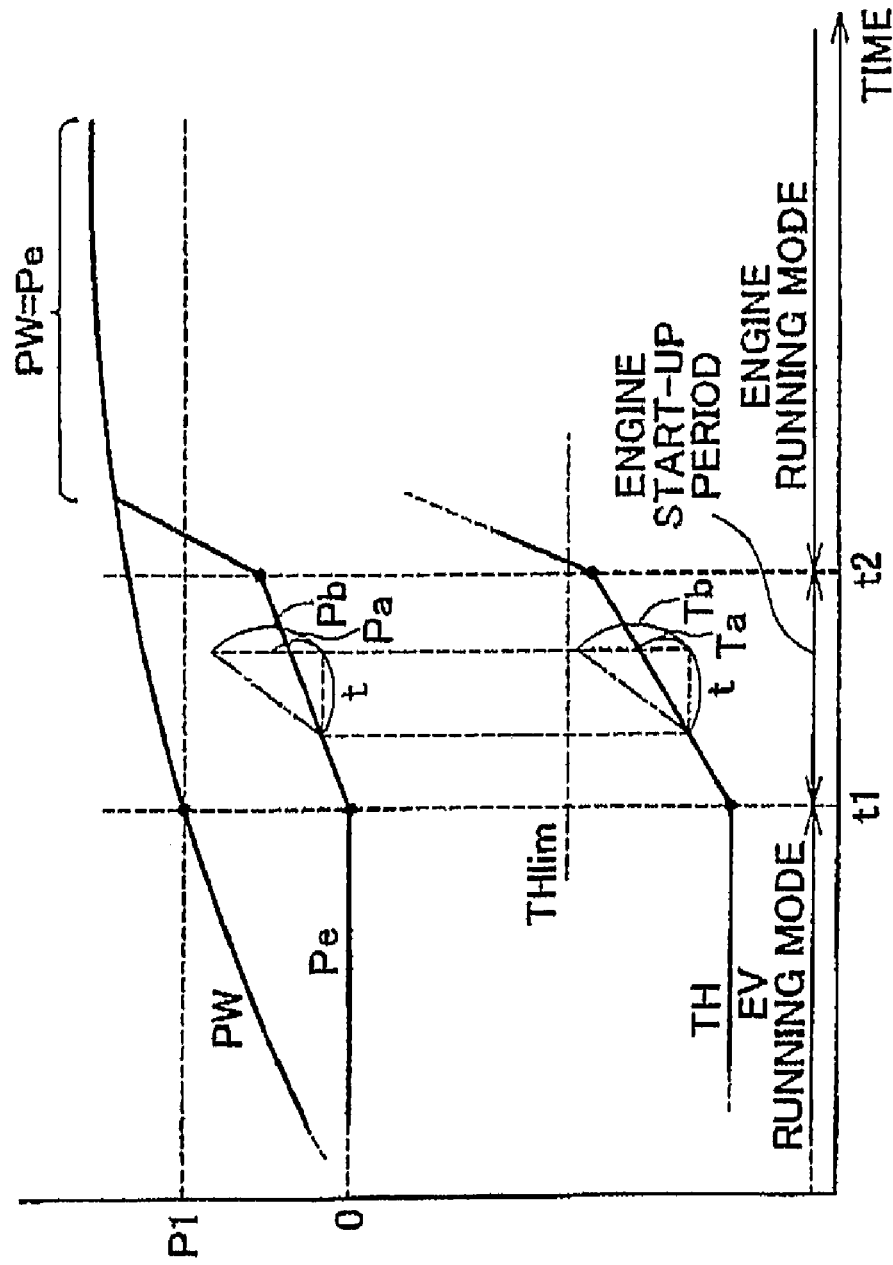
FIG. 7 is the time chart illustrating the control executed by a control apparatus 310 shown in FIG. 2 while the engine 120 starts up.

FIG. 7 is the time chart used to describe the control executed by the control apparatus 310 shown in FIG. 2 while the engine 120 starts up.

As shown in FIG. 7, the vehicle power PW is less than a predetermined value P1 before time t1. Accordingly, the hybrid vehicle 100 shown in FIG. 1 runs in the EV running mode before time t1. The engine power Pe is equal to 0 before time t1.

The vehicle power PW increases, for example, as the hybrid vehicle 100 accelerates. When the vehicle power PW reaches the predetermined value P1 at time t1, the control apparatus 310 shown in FIG. 2 initiates start-up of the engine 120.

At this time, the change-rate limiting control unit 324 limits the rate (Pa/t) of increase in the engine power Pe so that the rate of increase is equal to or lower than a predetermined power increase rate (Pb/t) for the predetermined time period (from time t1 to time t2).

The engine ECU 280 changes the throttle valve opening degree TH based on the engine power Pe. Accordingly, appropriately setting the rate (Pa/t) of increase in the engine power Pe makes it possible to limit the rate (Ta/t) of increase in the throttle valve opening degree TH so that the rate of increase is equal to or lower than a predetermined opening degree increase rate (Th/t) set based on the predetermined power increase rate (Pb/t).

According to the embodiment of the invention, the rate of increase in the throttle valve opening degree TH is set to a value based on which the throttle valve opening degree TH does not exceeds the prescribed limit THlim at time t2. Appropriately setting the rate (Pa/t) of increase in the engine power Pe also makes it possible to limit the rate (Ta/t) of increase in the throttle valve opening degree TH.

The running mode of the hybrid vehicle 100 shown in FIG. 1 switches from the EV running mode to the engine running mode at time t2. After time t2, the change-rate limiting control unit 324 causes the engine power Pe to follow the vehicle power PW (Pe=PW). The throttle valve opening degree TH also changes in accordance with the increase of the engine power Pe. In contrast, the motor power decreases at an appropriate rate. Thus, it is possible to smoothly change the motor power and the engine power Pe, without causing a shock that can be felt by the driver, from a state where the motor power is equal to the vehicle power PW to a state where the engine power Pe is equal to the vehicle power PW.

Figure 8:
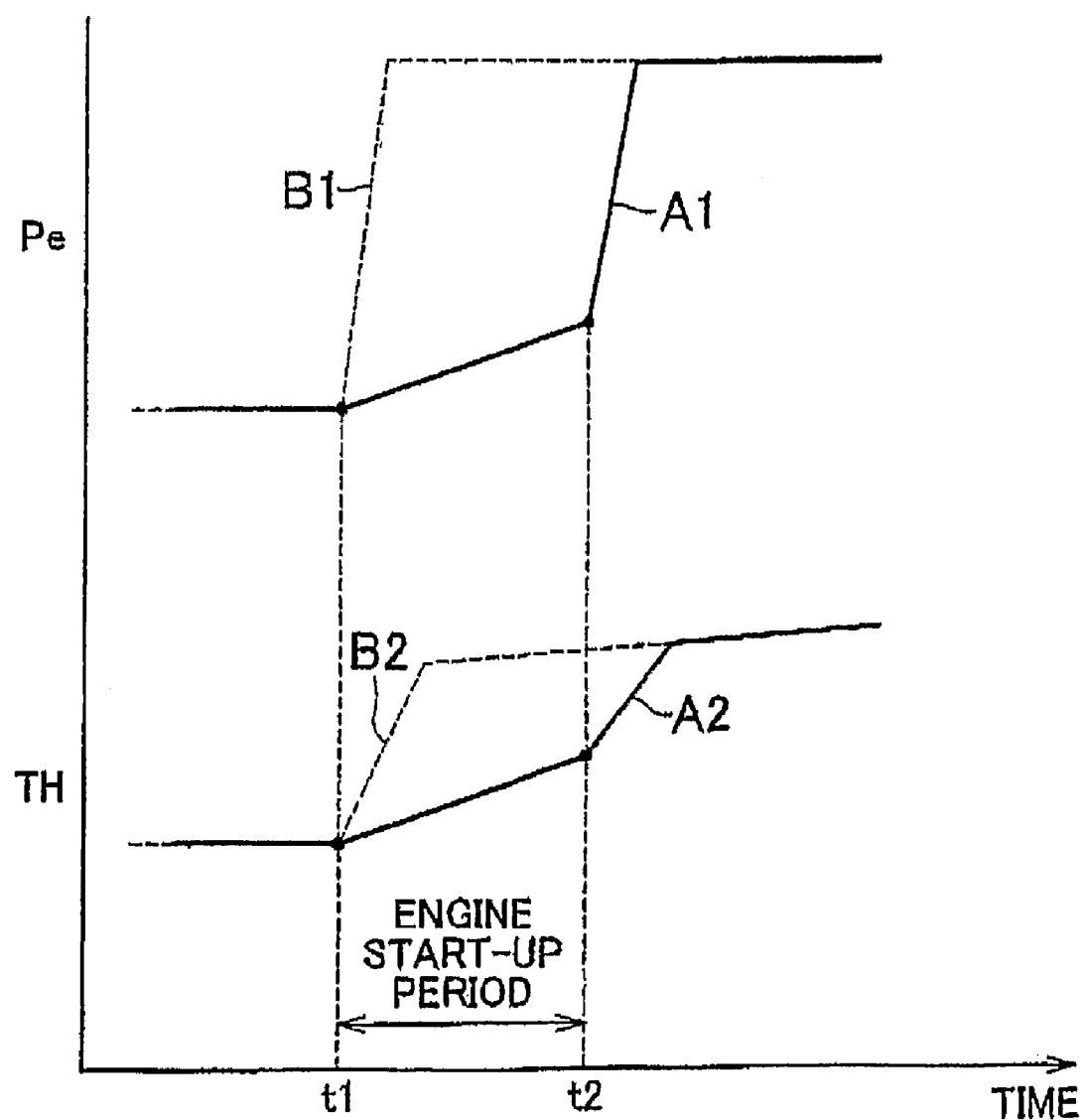
FIG. 8 is the time chart comparing the embodiment of the invention with a comparative example in terms of the manner in which the engine power Pe and the accelerator pedal operation amount change while the engine starts up.

FIG. 8 is the time chart used to compare the embodiment of the invention with a comparative example in terms of the manner in which the engine power Pe and the accelerator pedal operation amount change while the engine starts up. The comparative example differs from the embodiment of the invention in that the increase in the engine power during the engine start-up period is not limited. According to the comparative example, a quick response of the vehicle is achieved immediately after the initiation of the engine start-up; in other words, a target vehicle power is obtained within a short time from when the engine start-up is initiated.

Times t1, t2 in FIG. 8 correspond to times t1, t2 in FIG. 7, respectively. In FIG. 8, the solid line A1 shows a change in the engine power Pe according to the embodiment of the invention. The broken line B1 shows a change in the engine power Pe according to the comparative example. The solid line A2 shows a change of the throttle valve opening degree TH according to the embodiment of the invention. The broken line B2 shows a change in the throttle valve opening degree TH according to the comparative example.

The comparison between the solid line A1 and the broken line B1 indicates that, after time t1, the engine power Pe shown by the broken line B1 according to the comparative example increases more rapidly than the engine power Pe shown by the solid line A1 according to the embodiment of the invention. In response to such changes in the engine powers Pe, the rate of increase in the throttle valve opening degree TH shown by the broken line B2 according to the comparative example is greater than the rate of increase in the throttle valve opening degree TH shown by the solid line A2 according to the embodiment of the invention.

In the comparative example, although the torque output from the engine is high when the engine starts self-operating, such high torque is suddenly transferred to the power split mechanism 200, the speed reduction gear 180, and the axle of the drive wheels 160 (the above-mentioned "power transfer mechanism"). Accordingly, a shock occurs in the power transfer mechanism, and, therefore, the driver may feel a vibration etc. In the hybrid vehicle 100, however, an effect of the running performance due to a rapid increase of the torque output from the engine is less than expected.

Further, in the comparative example, the engine power Pe in the engine start-up varies depending on a running condition etc. of the vehicle. This is because the vehicle power PW varies depending on the running condition of the vehicle.

Therefore, in the comparative example, the amount of air taken into the engine in the engine start-up may be different each time. Accordingly, in the comparative example, the air-fuel ratio of the air-fuel mixture burned in the engine start-up may be different each time. As a result, the amount of pollutants in the exhaust gas may vary, or the air-fuel mixture may be lead to incomplete combustion.

According to the embodiment of the invention, the increase in the engine power Pe is suppressed for the time period from time t1 to time t2. Thus, according to the embodiment, the shock caused in the power transfer mechanism is suppressed. Accordingly, it is possible to prevent vibration, etc. that can be felt by the driver.

Further, according to the embodiment of the invention, the throttle valve opening degree TH is equal to or lower than the prescribed limit THlim for the engine start-up period, and the rate of increase in the throttle valve opening degree TH is also limited. Therefore, according to the embodiment of the invention, it is possible to reduce variation in the amount of air taken into the engine in the engine start-up, thereby leading to reduce variation in the air-fuel ratio. As a result, according to the embodiment of the invention, it is possible to suppress variation in the amount of pollutants in the exhaust gas, and also it is possible to reliably burn the air-fuel mixture while the engine starts up.

In the embodiment of the invention, the response of the vehicle in the engine start-up may be slower. However, such inconvenience is minimized by setting the time period from time t1 to time t2 optimally. This makes it possible to set the response of the vehicle in the engine start-up so that the driver does not feel a sense of discomfort.

The control apparatus for an internal combustion engine according to the invention may be employed in vehicles other than the hybrid vehicle 100. For example, the control apparatus for an internal combustion engine according to the invention may also be applicable to an economy running vehicle. In the economy running vehicle, when the vehicle is temporarily stopped, idling of the engine is forcibly stopped in response to the satisfaction of a predetermined engine stop condition, and when the engine stop condition ends, the engine becomes cranking automatically, and restarts.

The embodiment of the invention that has been described in the specification is to be considered in all respects as illustrative and not restrictive. The technical scope of the invention is defined by claims, and all changes that come within the meaning and range of equivalency of the claims are therefore intended to be embraced therein.

The invention claimed is:

1. A control apparatus for an internal combustion engine installed in a hybrid vehicle having a motor that, together with the internal combustion engine, are used as a driving source, the control apparatus comprising:
    a throttle valve drive unit that drives a throttle valve to change an opening degree of the throttle valve, the throttle valve adjusting an amount of air taken in the internal combustion engine; and
    a start-up control unit that controls the throttle valve drive unit such that the opening degree does not exceed a prescribed limit and a rate of increase in the opening degree is equal to or lower than a predetermined opening degree increase rate for a predetermined time period after start-up of the internal combustion engine is initiated, when the vehicle is running with power of the motor, the start-up control unit comprising:
    an opening degree command unit that calculates a target opening degree based on a required power to be output from the internal combustion engine and commands the throttle valve drive unit to open the throttle valve up to the target opening degree; and
    an output power control unit that executes a limiting control to change the required power such that a rate of increase in the required power is equal to or lower than a predetermined power increase rate, the output power control unit comprising:
        a vehicle power calculation unit that calculates, based on at least an accelerator pedal operation amount and a state of charge of a traction battery, a vehicle power required to drive the vehicle; and
        a limiting control unit that starts the limiting control when the vehicle power exceeds a predetermined value, terminates the limiting control when the predetermined time period has elapsed after start-up of the internal combustion engine is initiated, and causes the required power to follow the vehicle power after the limiting control is completed.

2. The control apparatus according to claim 1, wherein the limiting control unit increases the required power up to a value equal to the vehicle power after the limiting control is completed.

3. The control apparatus according to claim 1, wherein the predetermined time period elapses at a time corresponding to the beginning of an engine running mode where the vehicle is powered by the internal combustion engine.

4. The control apparatus according to claim 1, wherein the opening degree increases during the predetermined time period after start-up of the internal combustion engine is initiated.

5. A control method for an internal combustion engine that is installed in a vehicle and provided with a throttle valve that adjusts an amount of air taken in the internal combustion engine, the method comprising;
    controlling an opening degree of the throttle valve such that the opening degree does not exceed a prescribed limit and a rate of increase in the opening degree is equal to or lower than a predetermined opening degree increase rate for a predetermined time period after start-up of the internal combustion engine is initiated, when the vehicle is running with the power of a motor and driving the throttle valve under the control to increase the opening degree of the throttle valve;
    wherein controlling such opening degree comprises:
        calculating a target opening degree based on a required power to be output from the internal combustion engine and opening the throttle valve up to the target opening degree; and
        executing a limiting control to change the required power such that a rate of increase in the required power is equal to or lower than a predetermined power increase rate;
    wherein a vehicle power required to drive the vehicle is calculated based on at least an accelerator pedal operation amount and a state of charge of a traction battery that provide electric power to drive the motor;
    wherein the limiting control is started when the vehicle power exceeds a predetermined value and is terminated when the predetermined period has elapsed after start-up of the internal combustion engine is initiated; and
    wherein the required power is caused to follow the vehicle power after the limiting control is terminated.

* * * * *